United States Patent [19]

Griffaton

[11] Patent Number: 5,006,268
[45] Date of Patent: Apr. 9, 1991

[54] DEVICE FOR LASER WELDING INSIDE A TUBULAR ELEMENT

[75] Inventor: Jacques Griffaton, Chalon S/Saone, France

[73] Assignee: Framatome, Bevoie, France

[21] Appl. No.: 544,898

[22] Filed: Jun. 28, 1990

[30] Foreign Application Priority Data

Jun. 28, 1989 [FR] France .................................. 89 08634

[51] Int. Cl.⁵ ............................................ B23K 26/00
[52] U.S. Cl. ............................ 219/121.63; 219/121.78; 376/260
[58] Field of Search ...................... 219/121.63, 121.64, 219/121.76, 121.78, 121.74; 376/260

[56] References Cited

U.S. PATENT DOCUMENTS

| 4,694,136 | 9/1987 | Kasner et al. | 219/121.63 X |
| 4,694,137 | 9/1987 | Hawkins et al. | 219/121.63 |
| 4,724,298 | 2/1988 | Hawkins et al. | 219/121.76 X |
| 4,827,098 | 5/1989 | Kasner et al. | 219/121.63 |
| 4,855,564 | 8/1989 | Hawkins et al. | 219/121.64 X |

FOREIGN PATENT DOCUMENTS 0244283 11/1987 European Pat. Off. .

OTHER PUBLICATIONS

"Housing Welding Method ... Vessel"-Sep. 9/81-vol. 5, No. 143 (M-87) (815).
"Laser Working Equipment"-vol. 6-No. 76 (M-128) (954)-May 13, 1982.

Primary Examiner—C. L. Albritton
Attorney, Agent, or Firm—Pollock, Vande Sande & Priddy

[57] ABSTRACT

During welding, the position of the mirror (37) reflecting the laser beam is controlled by a sensor (40) resting on the tubular element (M) to be welded.

Application to the sleeve coupling of the tubes of steam generators of pressurized water nuclear reactors.

7 Claims, 7 Drawing Sheets

DEVICE FOR LASER WELDING INSIDE A TUBULAR ELEMENT

The invention relates to a device for laser welding inside a tubular element, of the type comprising a welding laser, a welding head equipped with means for centring in the tubular element and comprising an optical cell which itself comprises means for focusing and optical reflection for receiving a light beam along the axis of the head and for reflecting this beam focused on a point of impact of the wall of the tubular element, and means for conveying the laser beam of the laser to the optical cell. It is applied, in particular, to the restoration of the leaktightness of the tubes of steam generators of a pressurised water nuclear reactor.

The steam generators of pressurised water nuclear power plants generally comprise a bundle consisting of a very large number of tubes of small diameter bent into a U shape and fixed at each end by crimping in a very thick tube plate. The part of the steam generator located below the tube plate consists of a water box, in a first part of which the pressurised "primary" water coming from the vessel of the reactor is distributed in the tubes of the bundle. In a second part, the water which has circulated through the tubes is recovered in order to be returned, via a pipe of the primary circuit of the reactor, into the vessel enclosing the core consisting of the fuel assemblies which heat the pressurised water. The feed water of the steam generator comes into contact with the outer surface of the tubes of the bundle in that part of the steam generator which is located above the tube plate in order to be converted into steam there, and this steam is conveyed to the turbine associated with the nuclear reactor.

The walls of the tubes of the bundle thus form a barrier between the pressurised water which forms the primary fluid of the reactor and the feed water which forms the secondary fluid. The primary fluid which comes into contact with the fuel assemblies and the internal structures of the vessel of the reactor contains radioactive products in a more or less substantial quantity. It is therefore appropriate to avoid any contact between the primary fluid and the secondary fluid whose contamination could have very damaging consequences. For this reason it is necessary to avoid as far as possible the appearance of leaks through the walls of the tubes of the bundle of the steam generator and to repair the tubes whose wall is perforated as quickly as possible and in an effective manner.

Such repairs are generally necessary during the normal working life of the reactor. In fact, due to stresses of a thermal and mechanical origin or to corrosion suffered by the tubes of the bundle, cracks may occur in the walls of the tubes of the bundle both on the primary side and on the secondary side. These repairs are performed during periods of maintenance of the nuclear reactor.

A procedure is known for repairing the tubes of the bundle of a steam generator by sleeve coupling these tubes at the location of the defect leading to a loss of leaktightness. A sleeve with an outside diameter which is slightly smaller than the inside diameter of the tube to be repaired and has a length which is sufficient to cover the defective area is inserted into the tube via the admission side of the tube plate with which the ends of the tubes are level. It is placed there so as to be level with the admission side of the tube plate for the tubes located in the central part of the latter, or halfway through the tube plate for the tubes located on the periphery of the latter. It is then fixed inside the tube in order to produce two leaktight joins between it and the tube on either side of the defective zone.

Numerous methods are known for fixing the sleeve on either side of the defective zone. In particular, it is known to perform a diametrical expansion of the sleeve in two zones near to its ends, one located in the thickness of the tube plate, the other beyond the exit side of the tube plate, and this after cleaning the tube in these two zones. The expansion may be obtained either using hydraulic or mechanical methods, such as tube expansion, or using methods of expansion on bursting, or using methods of welding or of brazing.

All these operations require action inside the water box of the steam generator, that is to say in a part of this generator which has been in contact with the primary fluid charged with radioactive products during operation of the reactor, and where a human operator is subjected to high levels of radioactivity.

Automatic and remote-controlled devices have therefore been proposed, which are capable of performing, at least partially, the operations necessary for sleeve coupling the tubes.

For example, a process and a device are known which make it possible to install in a leaking generator tube a sleeve from the outside of the water box. This process and this device have been the subject of the Patent Application FR-2,598,209. The sleeve is inserted into the tube from the outside of the water box via a flexible tube, called a boa, on a double hydraulic expander with which the operation of fitting in the tube is performed; after a sufficient expansion effected in the two zones located at the ends of the sleeve by means of swelling of the elastic membranes of the double expander, the sleeve remains positioned in the tube.

The membranes are then decompressed and the expander is removed from the sleeve. The fixing tools, upper tube expander and lower tube expander, are then successively inserted into the sleeve using the same flexible tube, into the upper zone and then the lower zone, respectively, in order to fix the sleeve by means of tube expansion.

The drawback of this method is that it does not enable strictly leaktight fixing of the sleeve to be obtained.

In order to remedy this drawback, it is known to fix the sleeve in the tube by means of laser welding at each end of the sleeve.

Patent Application FR-88/13,602 proposes a device of the type indicated above, in which the laser is of the YAG type and its beam is conveyed via an optical fibre. Means are provided for preliminary adjustment of the focusing of the beam, but these means do not take into account the ovalization of the sleeve.

U.S. Pat. No. 4,694,136 describes another device of the type indicated above, this device comprises an optical welding head installed in the tube and a power laser located outside the water box of the steam generator. The beam is conveyed using overhead optical means between the laser located outside the water box of the steam generator and the welding head. The welding head used has a drawback connected to the fact that the focal distance is maintained constant and equal to the firing distance by means of a thrust ball bearing located in front of the zone to be welded and an application spring; this system generates friction, jerks and vibrations which can damage the quality of the welding achieved. Moreover, it is ineffective when the thrust ball bearing rests on a weld bead which has already been achieved or on a variable diameter part of the sleeve.

The invention aims to permit effective maintenance of focusing during rotation of the welding head despite the ovalization of the sleeve or, more generally, of the tubular element in which the weld is performed.

To this end, the subject of the invention is a welding device of the abovementioned type, characterized in that it comprises means for detecting the form of the tubular element near to the said point of impact, said detecting means being independent from said centring means, and in that the focusing and reflecting means comprise an inclined mirror which is movably mounted in the welding head and whose position is controlled by the said detection means.

Illustrative embodiments of the invention will now be described with the aid of the appended diagrammatic figures, amongst which:

FIGS. 1A and 1B show the two types of sleeves used to repair nuclear reactor steam generator tubes:

FIG. 1A shows a longitudinal section of a sleeve MA used to repair tubes such as TA located in the periphery of a tube plate P. A weld bead JA forms the lower joint located approximately halfway through the plate P;

FIG. 1B shows a section in elevation of a long sleeve used to repair tubes located in the central part of the tube plate P, which is the case with 80% of tubes. The lower joint J is located close to the lower face of the plate.

The upper joint KA or K is, in both cases, located beyond the upper face of the plate P, near the upper end of the sleeve.

Figure 1A:
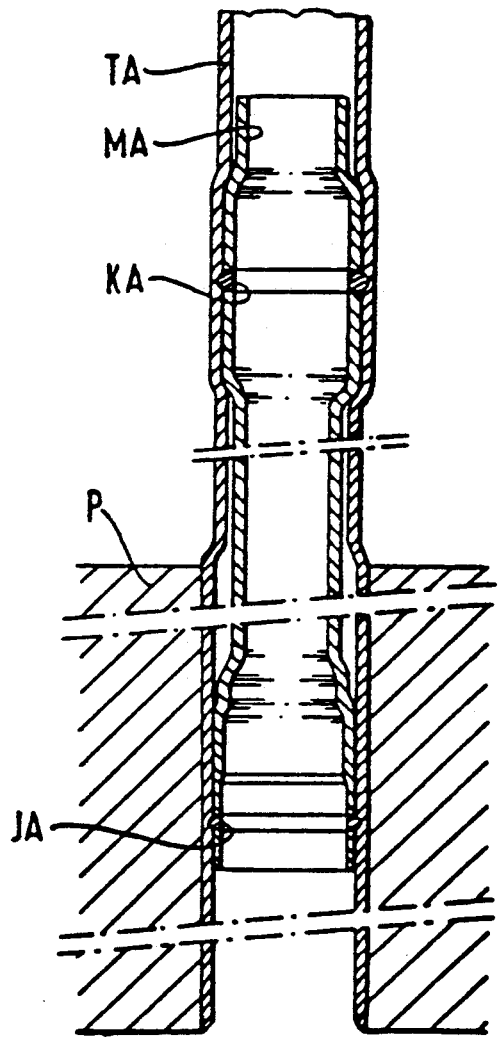
FIGS. 1A and 1B are longitudinal sections of two alternative embodiments of sleeves used for implementing the invention in the particular case referred to above.
Figure 1B:
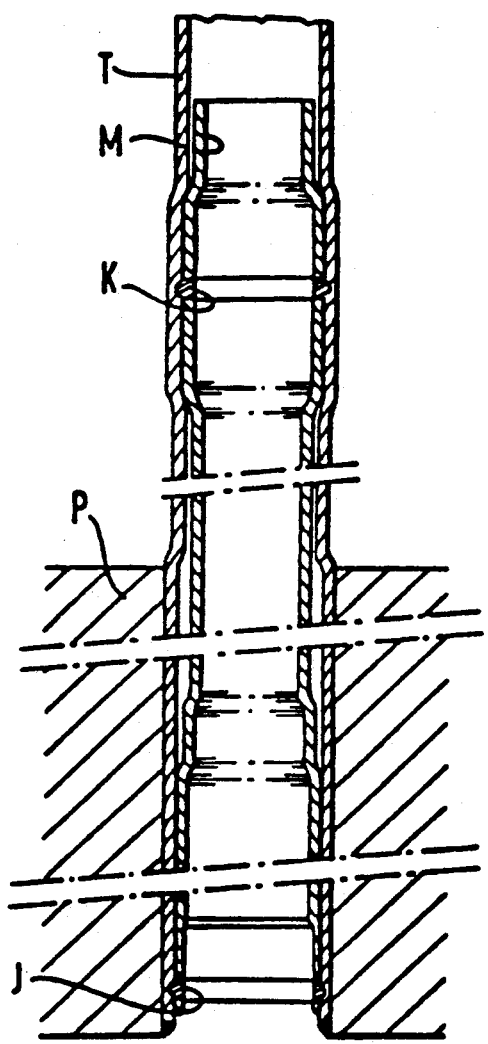
Figure 2:
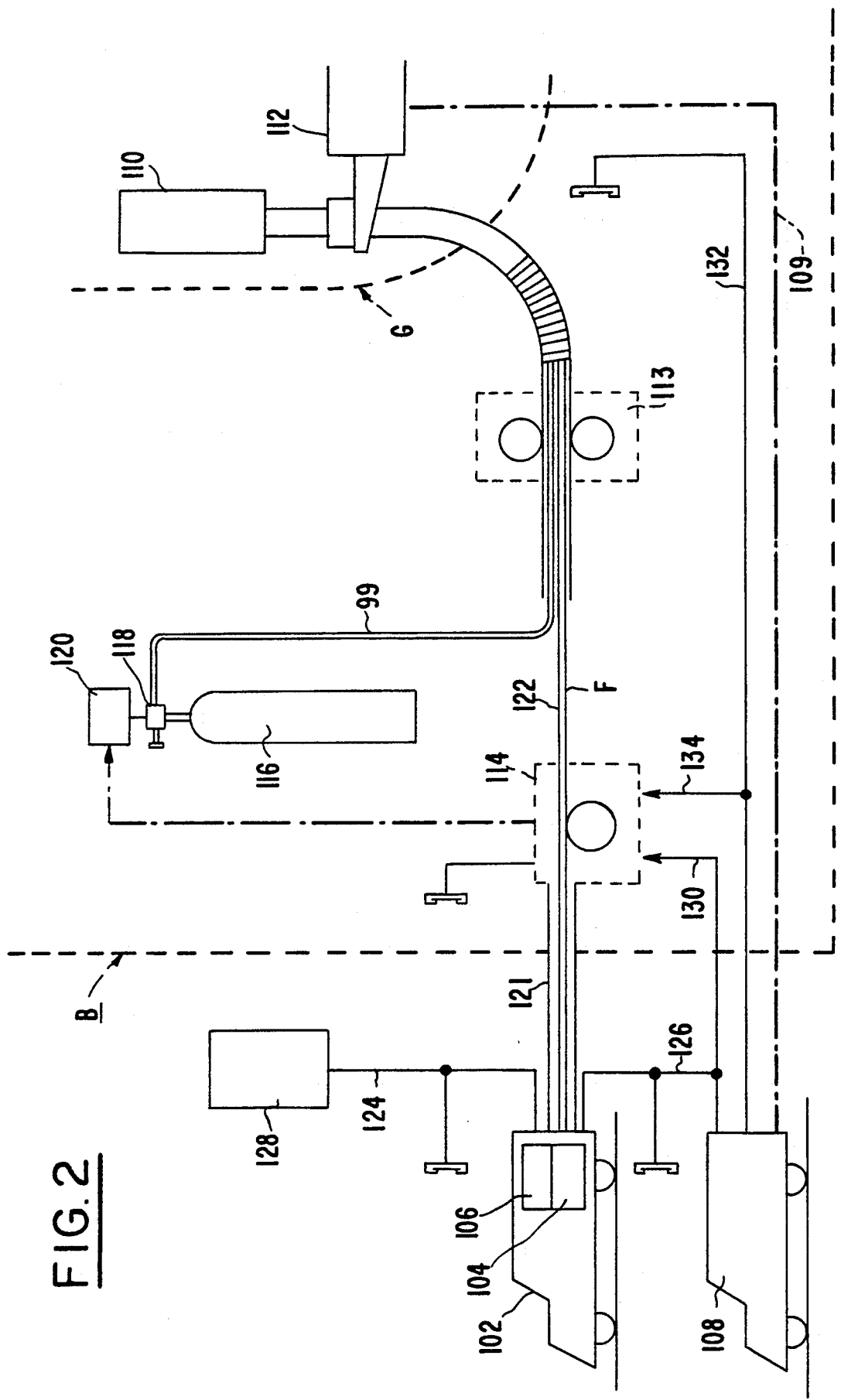
FIG. 2 is a general view of a welding device according to the invention in the same case.

FIG. 2 shows the assembly of elements forming the device according to the invention. These are:

A moveable laser control station 102 located outside the reactor building B. This station comprises a YAG type welding laser 104, an adjusting laser 106 of the helium/neon type emitting a visible light and coupled with the YAG laser, general electrical supply connections, connections for the coolant water, a control system, and video control means. The welding laser used is preferably a YAG neodymium laser with a wavelength of 1.06 microns, and having a power of 1.2 KW. However, any other laser which has a wavelength emission which does not exceed this value or for which there is a transparent optical fibre, and having a power in excess of 1,000 W, may be used.

A moveable carrier control station 108, for example located outside the reactor building but which may also be located inside this building for controlling a carrier 112. This station also comprises a control system, video control means, general electrical supply connections and connections 109 linking with the carrier in order to control the latter.

A terminal assembly 110 comprising the welding head. This assembly is carried at the end of an arm of the carrier 112, which is installed in the water box G of the steam generator.

An entrainment device 113 located in the reactor building near the steam generator.

A connection relay station 114 located in the reactor building.

A gas supply system comprising a bottle 116, valves 118 and valve actuators 120, located in the reactor building.

A non-rigid flexible conduit connecting the laser control station 102 with the welding device via the connection relay and the entrainment device. This conduit contains cables 122 for transmission of signals for controlling the welding device and an optical fibre F for conveying the light energy of the lasers towards the welding head contained in the terminal assembly 110. The optical fibre used is preferably a silica optical fibre. However, any other fibre which is transparent to the electromagnetic spectrum of the emission of the laser used may be suitable provided that its attenuation coefficient remains in the order of 10 and, preferably, 4 dB per km or less for the wavelength of the YAG laser.

Telecommunication cables 124, 126, 130, 132 and 134 also connect these various elements together and to a telephone terminal 128.

Figure 3:
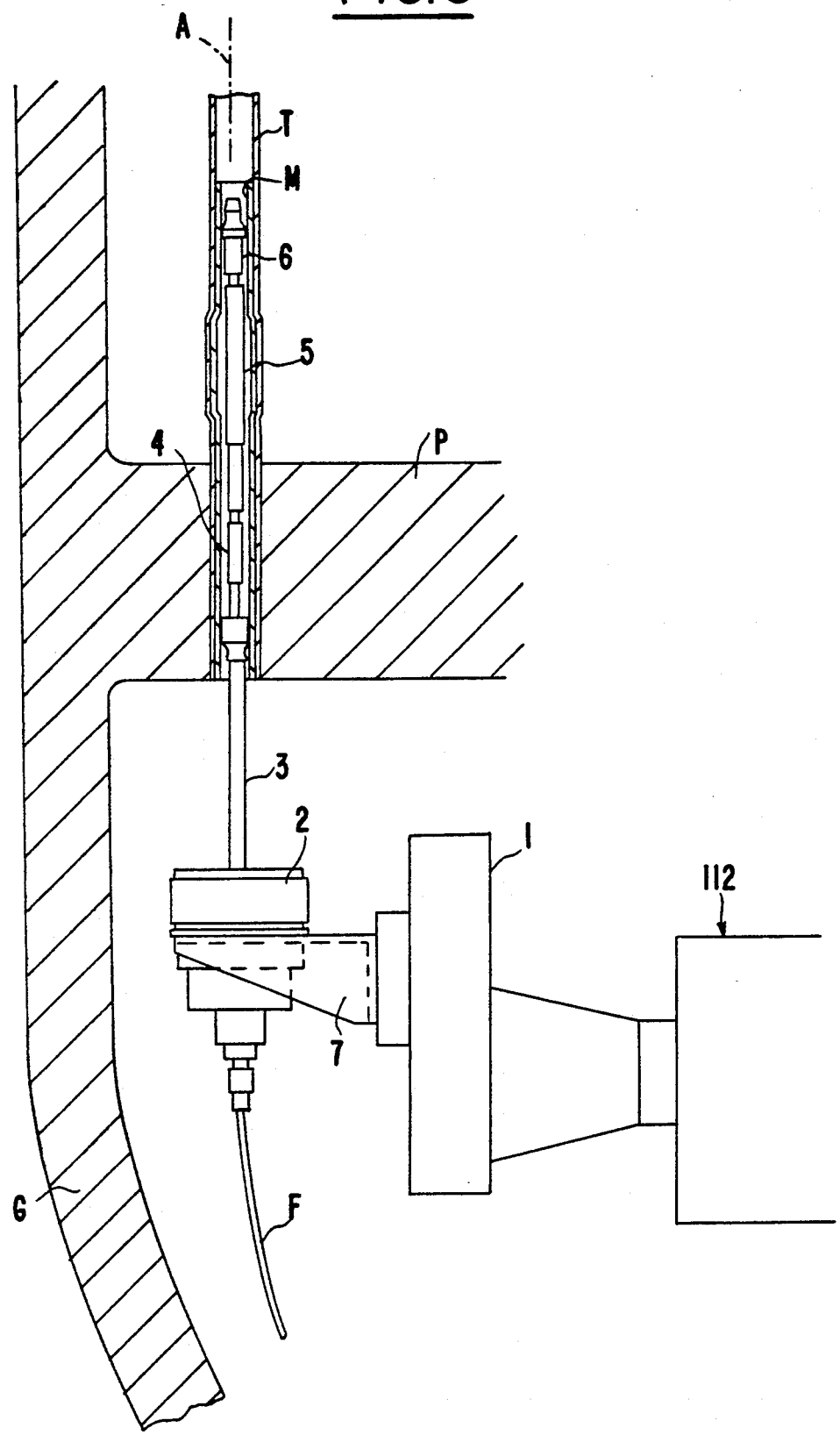
FIG. 3 is a longitudinal section of a part forming a of this welding device.

FIG. 3 shows elements of the terminal assembly 110. This assembly forms part of the welding device installed in the tube T to be repaired, or receiving tube, which has previously been equipped with a sleeve M to be welded. This assembly is shown in the welding position. It is fixed on an elevator 1 which ascends and descends at the end of the arm of the carrier 112 and which is used to introduce and position the welding head in the sleeve. It comprises a motorization cell 2 and the welding head. The latter consists of a non-rigid extension piece 3, a rigid extension piece 4, an optical cell 5 and a guide nose 6.

Figure 4:
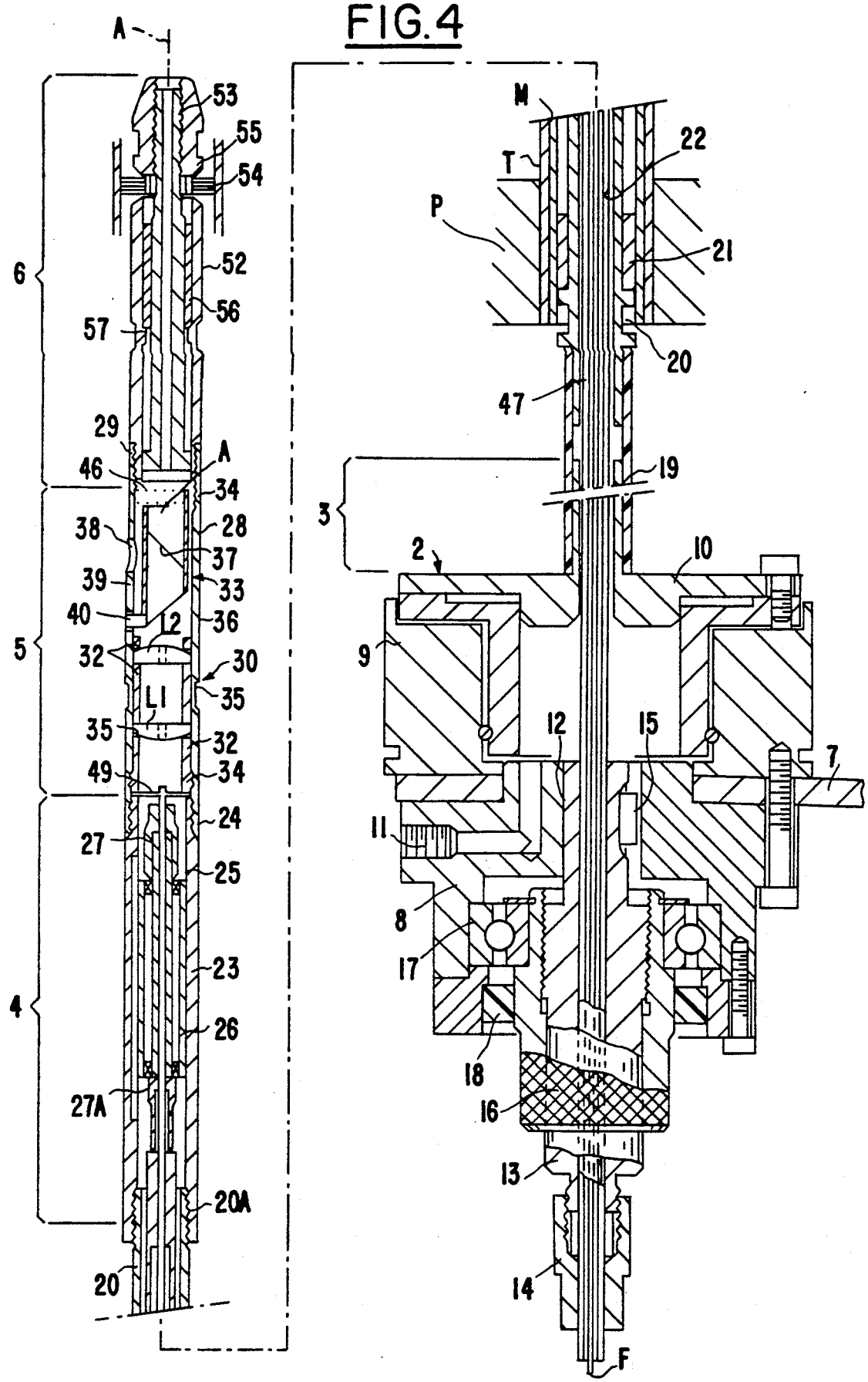
FIG. 4 is a longitudinal section, on an enlarged scale, of this same part of the welding device.

FIG. 4 shows a longitudinal section of this assembly. The cell 2 is fixed on the elevator 1 by means of a bracket 7 and comprises a housing 8 and the base 9 of a rotating plate mounted in the axis of one another. This rotating plate has a fixed base and a rotating core 10 on which the non-rigid extension piece 3 is fixed by means of crimping. The housing 8 has a gas inlet channel 11 and a central bore 12. The sheath 47 of the optical fibre F is held in a clamp 13 by means of a nut 14. This clamp slides axially in the bore 12 and is held against rotation by a key 15. The axial position of the clamp relative to the housing may be adjusted with the aid of a threaded ring 16 which makes it possible to adjust the position on mounting of the distal end of the fibre relative to the welding head. It will therefore be understood that the appropriate welding height is obtained by adjusting the position of the support bracket 7 using the elevator 1, and that the axial adjustment of the relative position of the optical fibre relative to the housing is obtained by rotating the ring 16. This ring is mounted so as to rotate freely and is fixed in translation in the housing by a bearing 17. In the figure, it is shown in the manual version without automatic control. However, it is easily automated, as described below. The seal of the mounting of the ring is provided by a gasket 18.

The non-rigid extension piece 3 consists of an outer sheath section 19 which is non-rigid and fitted over, at one end, the rotating core 10 of the rotating plate and comprises, at the other end, a rigid joining piece 20 ending in a screw thread 20A for screwing into the rigid extension piece 4. On this joining piece is mounted, so as to slide, a smooth bearing 21 whose outside diameter is very slightly smaller than the diameter of the sleeve M in the case represented of the sleeve coupling of the central tubes, or of the receiving tube in the case of the sleeve coupling of the peripheral tubes. This bearing ensures the guiding in rotation of the welding head. The joining piece has an inner bore 22 through which the optical fibre freely passes.

The rigid extension piece 4 consists of a cylindrical part 23 comprising, at one end, a female thread which interacts with the screw thread 20A of the nonrigid extension piece and, at the other end, a screw thread 24 for fixing the optical cell 5. This part has an inner bore 25 in which a bearing 26, around which there are provided longitudinal grooves, slides. This bearing is integrally attached to the optical fibre F. It consists of two ball bearings and a ring. This bearing ensures the axial guiding of the displacement of the optical fibre relative to the extension piece and the guiding in rotation of the assembly of the welding head relative to the optical fibre. The end of the optical fibre is crimped in a joining piece 27 and a stop 27A which hold the bearings of the bearing 26.

Figure 5:
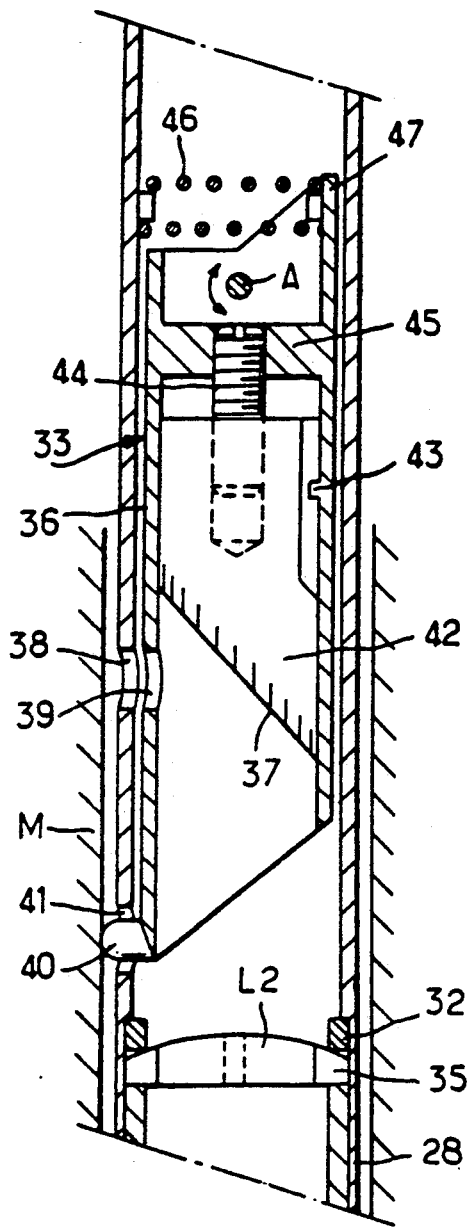
FIG. 5 is a longitudinal section, on a larger scale, of the optical cell of this device.

The optical cell 5 consists of a portion of tube 28 whose two ends have a female thread at 24 and 29. The lower female thread 24 receives the rigid extension piece, the upper female thread 29 receives the nose. A stack 30 of lenses L1, L2 and of spacers 32 is mounted inside this tube, fixed by means of a lower nut 34. The lenses and the nuts have, on four generatrices distributed at 90°, grooves 35 intended for the passage of the gas sweeping the welding zone. An optical part 33 is also mounted in the tube 28, above the stack 30. This part 33 (FIG. 5) comprises a tubular mirror holder 30 articulated in the tube 28 on a transverse spindle A. In this mirror holder is fixed a plain mirror 37 inclined at approximately 45° and parallel to the spindle A. The light beam penetrates into the mirror holder 36 along the longitudinal axis and undergoes radial reflection. In line with the reflected beam, the elements 28 and 36 have respective openings 38 and 39 which are opposite.

The lower end of the mirror holder 36 bears a sensor lug 40 which projects radially and passes through a guide hole 41 in the tube 28, provided on the same generatrix as the opening 38, below the latter and above the upper lens L2. The mirror 37 forms the lower face of a block 42 sliding in the mirror holder 36 and integrally attached to the latter in rotation by means of a key/groove system 43. Adjustment of the longitudinal position of the block 42 is performed by means of a screw 44 with two reverse pitches which is screwed, on the one hand, in the upper face of the block 42 and, on the other hand, in a transverse partition 45 of the mirror holder 36. A helical spring 46 perpendicular to the spindle A and located above the latter is compressed between the wall of the tube 28 and an upper extension 47 of the mirror holder 36 diametrically opposed to the opening 39. Thus, the sensor lug 40 is constantly held up against the tubular element M to be welded.

Figure 6:
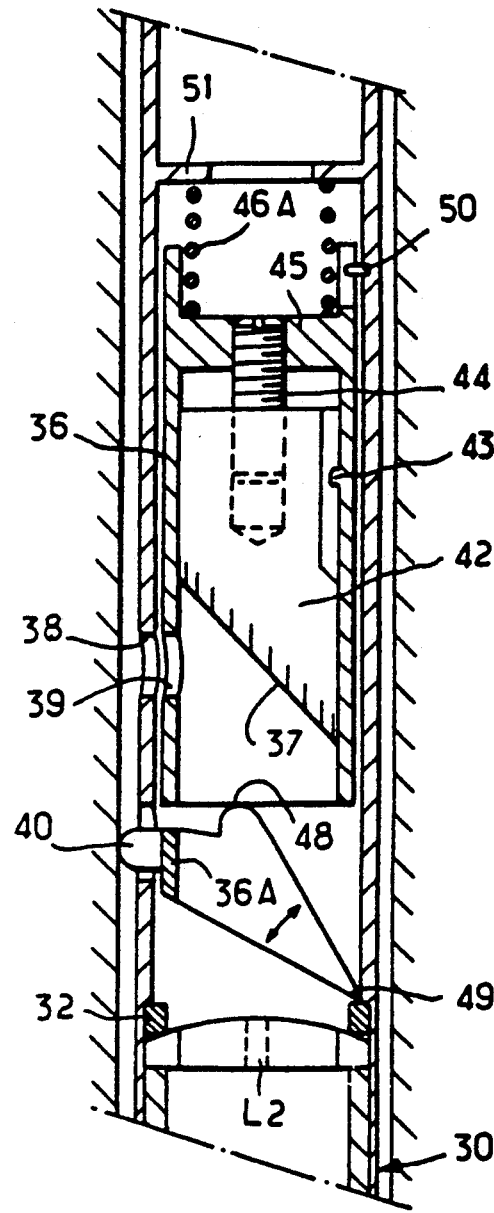
FIG. 6 is a section, similar to that in FIG. 5, of another embodiment of the optical cell.

The alternative embodiment in FIG. 6 differs from the preceding one in respect of the following points:

The lug 40 is carried by a tubular section 36A separated from the mirror holder 36 and resting, on the one hand, on the lower plane edge of the latter via two cam surfaces 48 and, on the other hand, on the upper spacer 32 of the stack 30 via a small zone 49 diametrically opposed to the lug 40. Thus, the section 36A may be moved in rotation around a transverse axis passing through the zone 49. This axis is at approximately the same distance from the wall to be welded and from the mirror holder 36.

Moreover, the mirror holder is moveable in translation in the tube 28, guided by a key/groove system 50, and it is stressed downwards by a helical spring 46A compressed between the partition 45 and a radial partition 51 provided in the tube 28.

The nose 6 (FIG. 4) consists of a tube 52 whose lower end is threaded for screwing on to the optical cell. Inside this tube, a shaft 53 carries a centring brush 54 held by a nose 55. This shaft slides in a bearing 56 force-fitted in the tube 52. A projection 57 limits the axial displacement of the shaft 53 in the tube.

During welding, the welding head, consisting of the outer sheath 19 of the non-rigid extension piece, the cylindrical part 20, the rigid extension piece 23, the optical cell 5 and the tube 52 of the nose performs, under the action of a rotation motor, which is not shown, included in the motorization cell 2, a complete rotation through 360° guided by the centring brush 54 in the upper part and by the sliding bearing 21. These are the two points of support on the inner face of the sleeve M. The optical fibre remains stationary during this rotation, as does the brush holder shaft 53 of the nose. If two or more slightly offset beads are required, the welding head may be displaced downwards in the longitudinal axis by virtue of the sliding bearings 21 and 56, the brush 54 remaining stationary.

In an alternative embodiment, the shaft 53 may carry two brushes 54 at a short distance from one another. The centring of the welding head is then ensured even if the ring 21 is below the plate P during welding performed near the lower face of the latter.

The extension pieces and the welding head delimit a continuous annular space about the protective sheath 47 of the optical fibre. This space is rendered continuous by the longitudinal grooves provided about the ball bearings of the rigid extension piece and at the location of the nuts and of the lenses, so as to permit the passage of gas sweeping the housing 8 up to above the weld.

Figure 7:
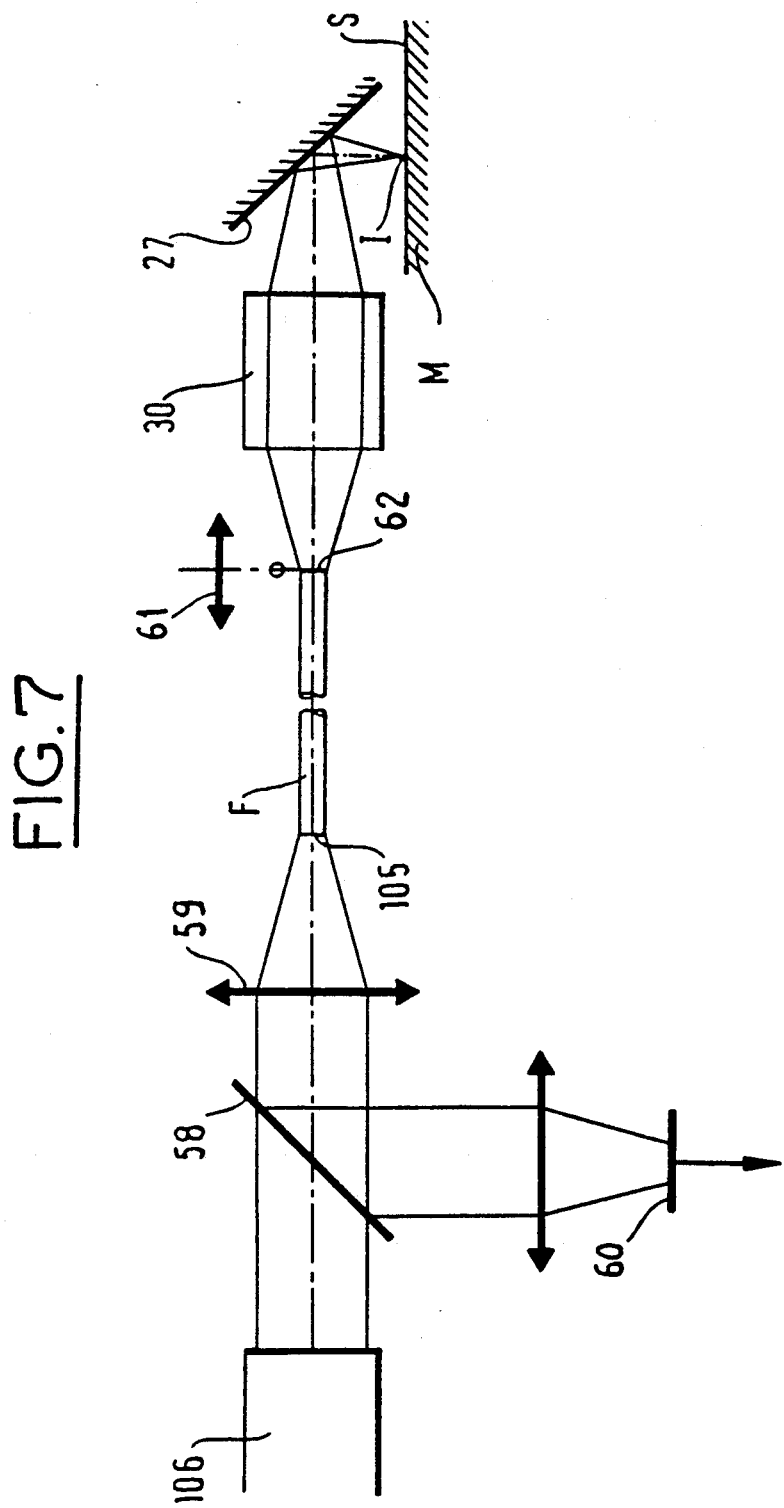
FIG. 7 is a diagram of the focusing means.

FIG. 7 shows the principle of the adjustment of the focusing distance of the beam on the inner surface of the sleeve. The optical head is inserted into the sleeve M to be welded. The adjusting laser 106 of the helium/neon type, whose visible light beam precisely matches the same path as the light of the welding laser, is then used. A separating plate 58 is then installed at the outlet of the laser 106, in front of a focusing lens 59 which concentrates the light on the entrance 105 of the fibre F. This plate allows the light beam coming from the laser to pass through, but reflects, onto a photovoltaic receiver 60, the beam coming from a lit spot which is centred on the point I on the inner face S of the sleeve M and which constitutes a bright object. If the axial position of the outlet end 62 of the optical fibre is varied relative to the optical cell which comprises the lens assembly 30 and the mirror 37, the signal supplied by the photovoltaic receiver 60 is maximum for an optimum position of the optical fibre corresponding to a focusing of the light on the point of impact I. In order to preset the position necessary for welding, the optimum position is sought by acting on the ring 16, and this position is stabilized by immobilising this ring, taking into account the known shift between the position of the focus of the HeNe beam and that of the focus of the YAG beam.

Figure 8:
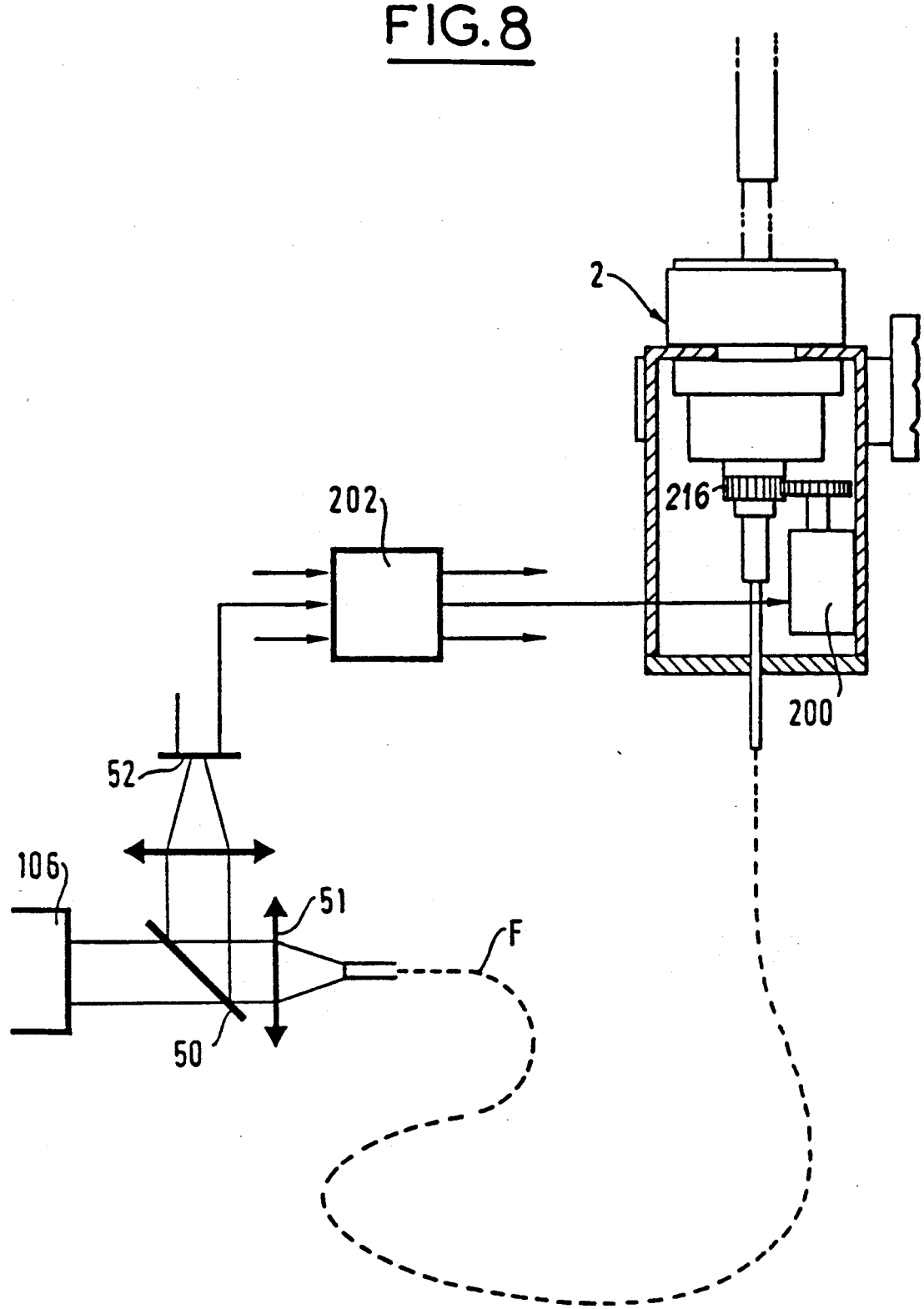
FIG. 8 shows an alternative embodiment of the device.

FIG. 8 shows a modified welding device in which the optimum axial position of the optical fibre is obtained by automatic adjustment of the position of a ring 216. This ring acts in the same manner as the ring 16 and it is driven by an adjusting motor 200 which is controlled by a central acquisition and management plant 202 after acquisition of data corresponding to a sleeve to be welded, the rest of the device remaining unchanged.

A description will now be given of the complete embodiment of the fixing of a sleeve by welding into a steam generator tube to be repaired using the device thus modified. A laser control station 102, comprising the YAG laser 104 and the visible laser 106, and a control station 108 of a carrier 112 installed inside the water box G of a steam generator which has leaky tubes such as T, are installed outside the reactor building of a nuclear power plant. Sleeves, such as M, to be welded have been fitted in these tubes using a known method. The carrier carries the terminal assembly 110 of the device comprising the welding head which is connected to the laser control post via a flexible tube containing the optical fibre F and signal transmission cables 124. This terminal assembly is remotely inserted with the welding head into the sleeve to be welded, this head is placed in a high position near the upper end of the sleeve using the lifting device 1, a visible laser beam is conveyed into the optical cell 5 and the position of the optical fibre is adjusted in order to obtain a minimum focal spot. Next, the welding laser beam is conveyed and the sleeve is welded onto the tube over one revolution. Using the lifting device, the welding head is then placed in the low position, near the lower end of the sleeve, a visible laser beam is conveyed into the optical cell and the position of the optical fibre is adjusted in order to obtain a minimum focal spot. Next, the welding laser beam is conveyed and the sleeve is welded onto the tube over one revolution.

During each welding operation, the sensor 40 follows the wall of the sleeve M and displaces the mirror 47 approximately radially (FIG. 5) or axially (FIG. 6). The geometry of the elements of the optical cell is calculated so that the length of the optical path of the upper lens L2 to the wall to be welded remains virtually constant during these displacements of the mirror. The laser beam thus remains constantly focused in the same optimum manner regardless of the ovalization of the sleeve M.

It will be observed that the sensor 40 interacts with a region of the sleeve located close to the zone to be welded and below the latter. This is therefore a clean region, with no weld bead and with a configuration which is virtually identical to that of the zone to be welded.

I claim:

1. Device for laser welding inside a tubular element, of the type comprising a welding laser (104), a welding head (3 to 6) equipped with means (21, 54) for centring in the tubular element and comprising an optical cell (5) which itself comprises means (L1, L2, 37) for focusing and optical reflection for receiving a light beam along the axis of the head and for reflecting this beam focused on a point of impact of the wall of the tubular element (M), and means (F) for conveying the laser beam of the laser to the optical cell, characterized in that it comprises means (40) for detecting the form of the tubular element (M) near to the said point of impact, said detecting means being independent from said centring means, and in that the focusing and reflecting means comprise an inclined mirror (37) which is movably mounted in the welding head (3 to 6) and whose position is controlled by the said detection means.

2. Device according to claim 1, characterized in that the said detection means comprise a sensor, (40) held up against the wall of the tubular element (M).

3. Device according to claim 1, characterized in that said detecting means (40) are provided upstream of an aperture (38) through which the light beam exits from the welding head (3 to 6).

4. Device according to claim 2, characterized in that the sensor (40) passes through an opening (41) in the welding head located upstream of the mirror (37) relative to the path of the light beam.

5. Device according to claim 2, characterized in that the sensor (40) is mechanically connected to the mirror (37).

6. Device according to claim 5, characterized in that the sensor (40) is integrally attached to a mirror support (36) stressed by a spring (46) and articulated about a spindle (A) parallel to the mirror (37).

7. Device according to claim 5, characterized in that the sensor (40) is carried by a cam holder element (36A) which is articulated in the welding head and which rests on a mirror support (36) stressed by a spring (46A) and moveable exially in this welding head.

* * * * *